(12) United States Patent
Moore

(10) Patent No.: US 11,694,167 B1
(45) Date of Patent: *Jul. 4, 2023

(54) SYSTEMS AND METHODS FOR PROVIDING MAINTENANCE TO FINANCIAL INSTITUTION DEVICES

(71) Applicant: Wells Fargo Bank, N.A., San Francisco, CA (US)

(72) Inventor: Alicia Y. Moore, San Ramon, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/850,856

(22) Filed: Jun. 27, 2022

Related U.S. Application Data

(63) Continuation of application No. 15/049,527, filed on Feb. 22, 2016, now Pat. No. 11,373,147.

(60) Provisional application No. 62/272,432, filed on Dec. 29, 2015.

(51) Int. Cl.
  *G06Q 10/20* (2023.01)
  *H04W 4/02* (2018.01)
  *G07C 9/37* (2020.01)

(52) U.S. Cl.
  CPC .............. *G06Q 10/20* (2013.01); *G07C 9/37* (2020.01); *H04W 4/02* (2013.01)

(58) Field of Classification Search
  CPC ............ G06Q 10/20; G07C 9/37; H04W 4/02
  See application file for complete search history.

(56) References Cited

U.S. PATENT DOCUMENTS

| | | | |
|---|---|---|---|
| 4,621,326 A | 11/1986 | Rawlins | |
| 5,984,178 A | 11/1999 | Gill et al. | |
| 7,545,816 B1 | 6/2009 | Coutts et al. | |
| 7,992,777 B1 | 8/2011 | Block et al. | |
| 2008/0247767 A1 | 10/2008 | Scrafford et al. | |
| 2010/0006644 A1 | 1/2010 | Shepley et al. | |
| 2015/0186852 A1 | 7/2015 | Fuentes et al. | |

FOREIGN PATENT DOCUMENTS

CN    110197287 A  *  9/2019

OTHER PUBLICATIONS

M. E. Genevois, D. Celik and H. Z. Ulukan, "Analytic Network Process approach for automatic teller machines deployment problem," 2015 International Conference on Industrial Engineering and Systems Management (IESM), 2015, pp. 1171-1178, doi: 10.1109/IESM.2015.7380301. (Year: 2015).

* cited by examiner

*Primary Examiner* — Sarah M Monfeldt
*Assistant Examiner* — Wenren Chen
(74) *Attorney, Agent, or Firm* — Foley & Lardner LLP

(57) ABSTRACT

Disclosed are systems, methods, and non-transitory computer readable mediums for receiving a location of a mobile device, determining an identity of a user of the mobile device, determining respective proximities of the mobile device to a plurality of devices, receiving statuses of the devices, determining an authorized subset of the devices, generating a list of statuses of the authorized subset for which the user is authorized with the list ordered by priority and a device type having a higher priority than a status, generating maintenance instructions for a portion of the authorized subset, and transmitting the list of statuses and the maintenance instructions to the mobile device.

18 Claims, 6 Drawing Sheets

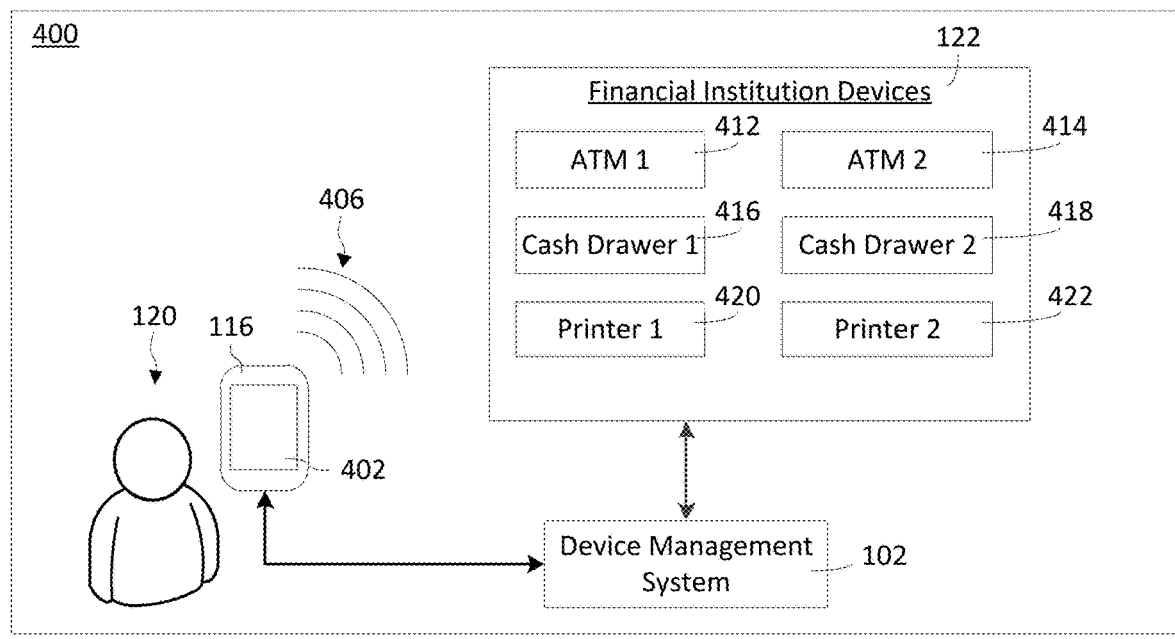

FIG. 4

| Device Status | | |
|---|---|---|
| 502 Device/Priority | 504 Status | 506 Recommended Action |
| 1. ATM 1 | Needs maintenance | Report to Device Custodian |
| 2. ATM 1 | Disconnected from Network | Call Maintenance |
| 3. ATM 2 | Out of Cash | Report to Device Custodian |
| 4. Cash Drawer 1 | Needs maintenance | Call Maintenance |
| 5. Cash Drawer 1 | Needs Cash | Report to Device Custodian |
| 6. Cash Drawer 2 | Operational | None |
| 7. Printer 2 | Out of ink | Report to Device Custodian |
| 8. Printer 2 | Out of paper | Report to Device Custodian |
| 9. Printer 1 | Operational | None |

FIG. 5

SYSTEMS AND METHODS FOR PROVIDING MAINTENANCE TO FINANCIAL INSTITUTION DEVICES

CROSS-REFERENCE TO RELATED APPLICATIONS

This application is a continuation of U.S. patent application Ser. No. 15/049,527, filed on Feb. 22, 2016, which claims the benefit of and priority to U.S. Provisional Patent Application No. 62/272,432, filed Dec. 29, 2015, each of which are incorporated by reference herein in their entirety.

TECHNICAL FIELD

Embodiments of the present disclosure relate generally to the field of financial institution device maintenance.

BACKGROUND

Financial institutions desire to minimize the down-time of devices that are used in a financial institution environment. Such devices may include automated teller machines (ATMs), cash drawers, printers, vaults, drive-through vacuum tubes, etc. Traditionally, management and/or maintenance of these devices may include detecting any necessary maintenance upon use of the device and responding to fix the device at that point in time. However, the fact that maintenance is required may not be detected until much after the occurrence of the problem. For example, ATMs are sometimes located outside the building that houses a branch location. As a result, bank personnel may not notice that maintenance is needed right away. Such a delay may exacerbate an original problem and lead to potentially more down-time of the device. As a result, financial institutions may lose money in not servicing the devices and in a customer's inability to use the device, while customers may find such down devices irritating.

SUMMARY

A first exemplary embodiment relates to a system. The system includes a processor coupled to a non-transitory storage medium, wherein the processor is structured to: receive an indication of a location of a mobile device; determine an identity of a user of the mobile device, wherein the identity of the user translates to a level of authorization of the user; determine a proximity of the mobile device to a plurality of financial institution devices; receive a status of the plurality of financial institution devices; and transmit, for a subset of the plurality of financial institution devices, the status of the subset of the plurality of financial institution devices to the mobile device.

Another exemplary embodiment relates to a method. The method includes receiving, by a detection circuit of a device management system comprising at least one processor connected with at least one memory device, an indication of a mobile device; determining, by authorization logic, an identity of a user of the mobile device, wherein the identity of the user translates to a level of authorization of the user; determining, by proximity logic, a proximity of the mobile device to a plurality of financial institution devices; receiving, by priority logic, a status of the plurality of financial institution devices; and transmitting, by a display circuit of the device management system, for a subset of the plurality of financial institution devices, the status of the subset of the subset of the plurality of financial institution devices to the mobile device based at least in part on the proximity of the mobile device to the subset of the plurality of financial institution devices.

A further exemplary embodiment relates to an apparatus. The apparatus includes a detection circuit structured to receive an indication of a mobile device and determine a proximity of the mobile device to a plurality of financial institution devices; a priority circuit structured to receive and determine a priority of a status of the plurality of financial institution devices; authorization logic structured to determine an identity of a user of the one or more mobile devices and a translated level of authorization of the user; and a display circuit, communicably and operatively coupled to the authorization logic, priority circuit, and detection circuit, structured to: receive the level of authorization of the user; receive the priority of the status of the plurality of financial institution devices; receive the proximity of the mobile device; and generate, for a subset of the plurality of financial institution devices, the status of the subset of the plurality of financial institution devices based on the level of authorization of the user, the priority of the status, and the proximity of the mobile device.

These and other features, together with the organization and manner of operation thereof, will become apparent from the following detailed description when taken in conjunction with the accompanying drawings.

BRIEF DESCRIPTION OF THE DRAWINGS

FIG. 4 is a diagram of an environment for implementing the method of FIG. 3, according to an example embodiment.

FIG. 5 is a diagram of a display generated by the device management system of FIGS. 1-2 and the method of FIG. 3, according to an example embodiment.

DETAILED DESCRIPTION

Figure 1:
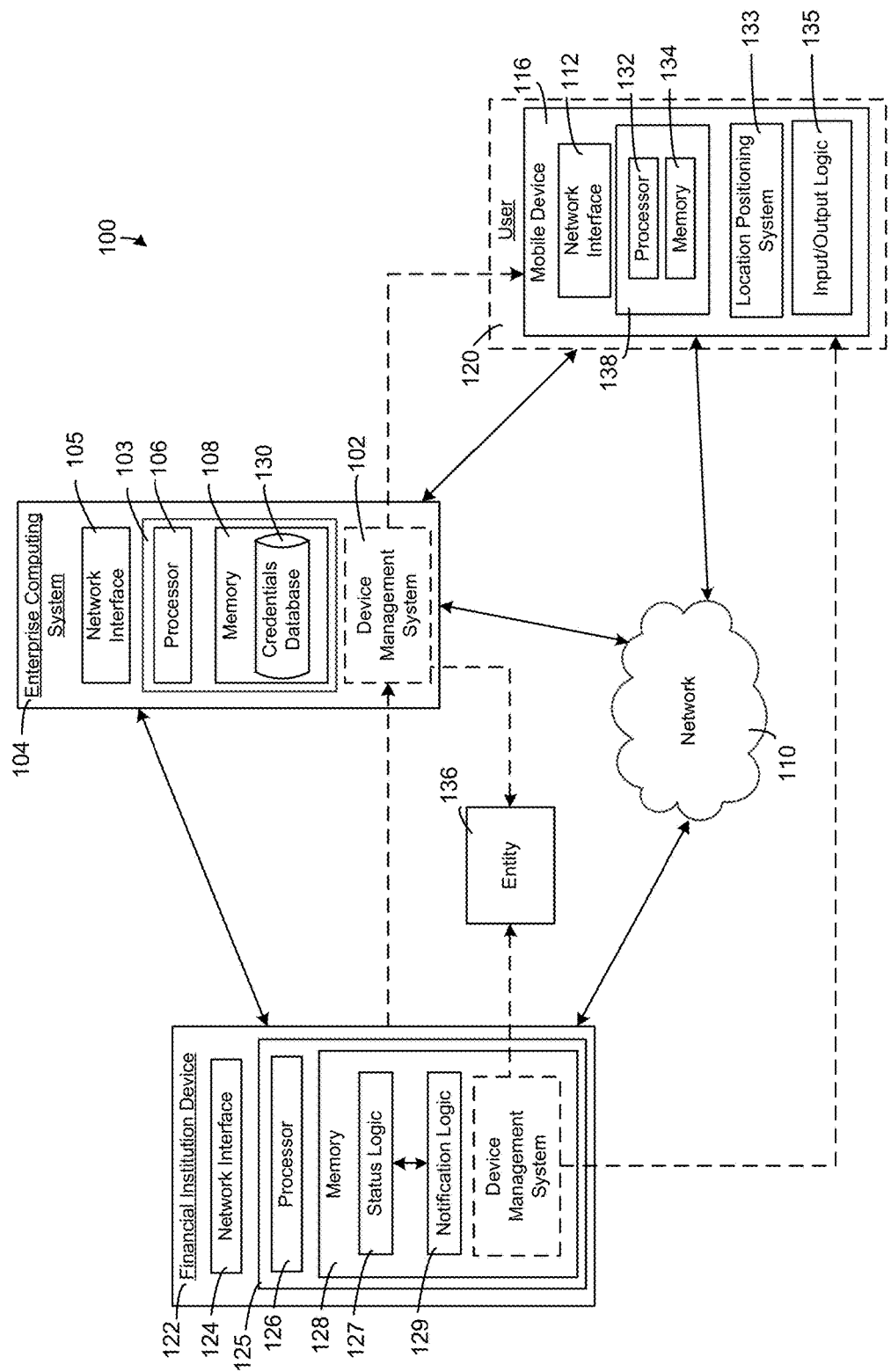
FIG. 1 is a schematic diagram of a device management system, according to an example embodiment.

Referring to the Figures generally, various systems, methods, and apparatuses relate to a device management system structured to determine a status of one or more financial institution devices and display the statuses on a mobile device. The status of the one or more financial institution devices may include that the one or more financial institution devices are operational, require maintenance, require a replacement part, and so on. According to the present disclosure, the device management system may facilitate the display of the status on a mobile device based on a level of authorization of a user of that mobile device. Accordingly, the device management system may determine an identity of the user and associate the identity of the user with a level of authorization. Further, the device management system may determine the proximity of the mobile device in relation to the one or more financial institution devices. The device management system may additionally determine the priority of the status of the financial institution device. The term "priority" may refer to a ranking of highest importance to lowest importance of a status of a financial institution device. In response to these determinations, the device management system may selectively display the status or other information regarding the status on the mobile device. According to one embodiment, the user of the mobile device may select a response to each of the displayed statuses. Based on that response, the device management system may cause transmission of an alert (e.g., a message) to a device (e.g., associated with personnel at the branch location) of the status of the financial institution device. In some embodiments, the personnel may then respond to the status by completing an action (e.g., replenish cash at an automated teller machine (ATM), perform maintenance on an ATM, replace ink in a printer).

An example implementation may be described as follows. A financial institution device (e.g., ATM, cash drawer, printer) may require maintenance or other attention. Such maintenance may include, but is not limited to, replenishing cash of the ATM or teller cash drawer, replacing ink in a printer, fixing the touch screen on an ATM, etc. Rather than a user determining that a financial institution device requires maintenance upon use of that device, the financial institution device may be monitored at all times by the device management system such that the status of those devices may be known contemporaneously or substantially contemporaneously to any problem occurring. Accordingly, upon detection of a problem, the device management system may generate and provide a message to the mobile device to display the status of the financial institution device on the mobile device. Beneficially, displaying real-time status updates of a financial institution device may facilitate faster turn-around times for maintenance and other upkeep procedures. According to the present disclosure, by displaying the statuses of one or more financial institution devices in one location, the device management system may promote better management of and response to financial institution device maintenance.

In operation, the device management system may facilitate the notification of mobile devices regarding statuses of financial institution devices. The mobile devices may be notified based on proximity to a financial institution device and an authorization level of the user associated with the mobile device to, in turn, provide effective messages to the user to handle the maintenance or problem occurring, if present, of the financial institution device. As an example, a financial institution device custodian may be responsible for a particular ATM. While walking around a branch of a financial institution, the device custodian may be positioned near the particular ATM and the custodian's mobile device may display a status of that ATM indicating that the ATM is low on cash. The device custodian can then react to that notification by replenishing the cash in that ATM.

Referring now to FIG. 1, a diagram of a system 100 is shown according to an example embodiment. As described in further detail below, the system 100 may facilitate monitoring a financial institution device 122 and receiving a status of that device 122. The system 100 may additionally detect or receive an indication of a detected mobile device 116. The system 100 may generate and selectively provide a message to the mobile device 116 to display the status of the financial institution device 122 based on a level of authorization of the user 120 of that mobile device 116. As shown, the system 100 may include an enterprise computing system 104 communicably and operatively coupled to a financial institution device 122, a mobile device 116 associated with a user 120, and a network 110. The network 110 may provide communicable and operative coupling between the mobile device 116 and the enterprise computing system 104, financial institution device 122, and the other components disclosed and described herein to provide and facilitate the exchange of communications (e.g., data, instructions, values, commands, etc.). Accordingly, the network 110 may include any network including wired (e.g., Ethernet) and/or wireless networks (e.g., 802.11X, ZigBee, Bluetooth, Internet, etc.). In some embodiments, the network 110 may further include a proprietary banking network to provide secure or substantially secure communications.

The user 120 may be any person or entity using the mobile device 116 and associated with the financial institution device 122. Such a user 120 may be affiliated with a financial institution (e.g., personnel at the financial institution) or may not be affiliated with the financial institution (e.g., financial institution device maintenance company). Accordingly, the user 120 may include, but is not limited to personnel at a branch of a financial institution, maintenance personnel affiliated with the financial institution, and maintenance personnel affiliated with a third party engaged by the financial institution to maintain the financial institution device(s) 122.

The mobile device 116 may include any type of mobile device 116 that may be used to monitor or is otherwise associated with the financial institution device 122. Mobile devices 116 may include any type of mobile device 116 including, but not limited to, a phone (e.g., smartphone, etc.) and a computing device (e.g., tablet computer, laptop computer, person digital assistant, etc.). In one embodiment, the mobile device 116 may include a specific computing device (e.g., a tablet computer) maintained by a financial institution and selectively usable by various financial institution personnel. In this regard, the personnel may have credentials for logging on to the specific computing device. Upon logging on, the computing device may determine an identity of the user and any associated privileges. Such information may be used by the device management system 102 in generating the content of the message that may be provided to the computing device.

As shown, the mobile device 116 includes a processing circuit 138, which may include a processor 132, memory 134, location positioning system 133, input/output logic 135, and network interface 112. The network interface 112 of the mobile device 116 may be adapted for and configured to establish a communication session via the network 110 with the enterprise computing system 104, device management system 102, and the financial institution device 122. Accordingly, the network interface 112 may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The processing circuit 138 may include a processor 132 and a memory 134. The processor 138 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 134 (e.g., RAM, NVRAM, ROM, Flash Memory, hard disk storage, etc.) may store data and/or computer code for facilitating the various processes described herein. Moreover, the one or more memory devices 134 may be or include tangible, non-transient volatile memory or non-volatile memory. Accordingly, the one or more memory devices 134 may include database components, object code components, script components, or any other type of information structure for supporting the various activities and information structures described herein.

The input/output logic 135 may be structured to receive and provide communication(s) to a user 120 of the mobile device 116 (or, to another entity such as the financial institution device 122). In this regard, the input/output logic 135 may be structured to exchange data, communications, instructions, etc. with an input/output component of the mobile device 116. Accordingly, in one embodiment, the input/output logic 135 may include an input/output device such as a display device, a touchscreen, a keyboard, and a microphone. In another embodiment, the input/output logic 135 may include communication circuitry for facilitating the exchange of data, values, messages, and the like between an input/output device and the components of the mobile device 116. In yet another embodiment, the input/output logic 135 may include machine-readable media for facilitating the exchange of information between the input/output device and the components of the mobile device 116. In still another embodiment, the input/output logic 135 may include any combination of hardware components (e.g., a touchscreen), communication circuitry, and machine-readable media.

The location positioning system 133 may be structured to receive location data and determine a location or receive information indicative of a location of the mobile device 116. In one embodiment, the location positioning system 133 may include a global positioning system (GPS) or any other type of location positioning system. As such, the location positioning system 133 may receive latitude data, longitude data, and any other type of location or position data to determine the location of the mobile device 116. In other embodiments, the location positioning system 133 may receive location data from the financial institution device 122 that indicates the location of the mobile device 116. In still other embodiments, the location positioning system 133 may receive an explicit location identification from the user 120 of the mobile device 116. All such variations are intended to fall within the spirit and scope of the present disclosure.

Still referring to FIG. 1, the system 100 also includes an enterprise computing system 104. The enterprise computing system 104 may be associated with or operated by a financial institution (e.g., a bank, a credit card issuer, etc.) or any other entity(ies) interested in monitoring and maintaining one or more financial institution devices 122. When embodied as a financial institution computing system, the enterprise computing system 104 may be operated by a financial institution that maintains, leases, purchases, and otherwise associates with financial institution devices 122, such as an automated teller machine (ATM), cash drawer, printer, vault, etc. In practice, the enterprise computing system 104 may include server computing systems, for example, comprising one or more networked computer servers having a processor and non-transitory machine readable media.

As such, the enterprise computing system 104 may include a network interface 105, which may be used to establish connections with other components of the system 100 by way of network 110. The network interface 105 may include program logic that facilitates connection of the enterprise computing system 104 to the network 110. The network interface 105 may support communication between the enterprise computing system 104 and other systems, such as the mobile device 116 and the financial institution device 122. For example, the network interface 105 may include a cellular modem, a Bluetooth transceiver, a Bluetooth beacon, a radio-frequency identification (RFID) transceiver, and a near field communication (NFC) transmitter. In some arrangements, the network interface 105 may include the hardware and machine-readable media sufficient to support communication over multiple channels of data communication. Further, the network interface 105 may include cryptography capabilities to establish a secure or relatively secure communication session with the enterprise computing system 104 and financial institution device 122 or another device in communication with the mobile device 116. In this regard, financial data (or other types of data) may be encrypted and transmitted to prevent or substantially prevent the threat of hacking.

The enterprise computing system 104 may further include a credentials database 130. The credentials database 130 may hold, store, categorize, and otherwise serve as a repository for the credentials of a user 120. As used herein, the term "credentials" may include one or more security elements a user 120 may be required to enter to gain access to the device management system 102, where access is defined as any type of action that allows a user 120 to view, edit, and/or otherwise operate the device management system 102 (e.g., view financial institution device 122 statuses). "Credentials" may additionally include one or more levels of authorization of the user 120. As used herein, the phrase "levels of authorization," also referred to herein as "authorization level," may refer to one or more predefined access levels that define an amount of access a particular user 120 has with regard to viewing, editing, and/or operating the device management system 102. As an example, the levels of authorization may correspond to the job position or title, the security clearance, and so on of the user 120 and may dictate the statuses displayed on the mobile device 116 while in use by the user 120. As such, "credentials" may include, but are not limited to, a name, username, employee number, job title, password, scanned eye data, facial data, fingerprint data, and so on of the user 120.

The credentials database 130 may be structured to selectively provide access to information relating to the credentials and a level of authorization of the user 120. In this regard, the credentials database 130 may be communicably and operatively coupled to the device management system 102 to provide access to such information, such that the device management system 102 may generate and provide a message to the mobile device 116 to display one or more statuses of a financial institution device 122 based on that information.

Still referring to FIG. 1, the system 100 may also include a financial institution device 122. As used herein, the term "financial institution device" refers to any financial institution device that the device management system 102 may monitor (e.g., to receive statuses relating to that device). In this regard, the "financial institution device" may include financial institution devices including, but not limited to, an ATM, a cash drawer, a printer, and so on. The financial institution device 122 may be structured to transmit status information to the device management system 102. In this regard, the financial institution device 122 may be communicably coupled to the enterprise computing system 104 and/or the mobile device 116 via the network 110. As shown in FIG. 1, in some embodiments, the financial institution device 122 may include the device management system 102.

The financial institution device 122 is shown to include status logic 127 and notification logic 129 communicably coupled to the status logic 127. The status logic 127 may be structured to determine or receive status information regarding the financial institution device 122. The notification logic 129 may be structured to transmit information to the device management system 102 regarding the status information of the financial institution device 122.

The status logic 127 may be structured to determine or receive status information regarding the financial institution device 122. In one embodiment, the status logic 127 may include or be communicably coupled to various hardware components, such as a code-reader diagnostic tool, to determine the status of the financial institution device 122. For example, the code-reader diagnostic tool may read a value produced by the financial institution device 122 that may indicate a status of the device 122. The code-reader diagnostic tool may then display the status of the device 122 based on the value received. In another embodiment, the status logic 127 may include machine-readable media stored by the memory 128 and executable by the processor 126, wherein the machine-readable media facilitates performance of certain operations to receive a value and/or data indicative of the status of the financial institution device 122. For example, the machine-readable media may provide an instruction (e.g., command, etc.) to the components of the financial institution device 122 to monitor and acquire data indicative of the status of the financial institution device 122. Accordingly, the machine-readable media may include, but is not limited to, logic structured to provide power-on self-tests (POST), register tests, and interrupt and exception tests. In yet another embodiment, the status logic 127 may include any combination of hardware components, as described above, and machine-readable media.

As used herein, the term "status" may include information regarding operation of the financial institution device 122. In one embodiment, the "status" may include categories of operation. For example, the "status" may include, but is not limited to, "operational," "needs maintenance," and "other." A status of "operational" may indicate that there is no problem or maintenance issues related to that particular financial institution device 122. Further, a status of "needs maintenance" may indicate that the financial institution device 122 has a technical issue that may need to be fixed. As an example, for an ATM, "needs maintenance" may include problems such as non-functional card reader, jammed cash dispenser, or other technical component of the financial institution device 122. A status of "other" may include problems that may be of a more routine nature, such as "out of ink" or "out of paper" for a printer and "out of cash" for an ATM. However, it should be understood that other example embodiments may utilize different status indications that do not depart from the spirit and scope of the present disclosure.

The notification logic 129 may be structured to notify the device management system 102 of the status of the financial institution device 122. In one embodiment, the notification logic 129 may include various hardware components, such as a transmitter, to send one or more statuses to the device management system 102. The transmitter may facilitate the sending of status information to the device management system 102 via the network 110. In another embodiment, the notification logic 129 may include communication circuitry including, but not limited to, wired and wireless communication protocol to facilitate transmission of the status of the financial institution device 122 to the device management system 102. In still another embodiment, the notification logic 129 may include machine-readable media stored by the memory 128 and executable by the processor 126, wherein the machine-readable media supports communication between the financial institution device 122 and the device management system 102, facilitating transmission of the status by the notification logic 129. In yet another embodiment, the notification logic 129 may include any combination of a hardware components (e.g., a transmitter), communication circuitry, and machine-readable content.

The notification may be provided via any type of transmission method. In this regard, the notification may be provided as a text message, an email, and/or an alert to the device management system 102. The notification may be based on the identity or level of authorization of a user 120 of the mobile device 116. The notification may additionally be based on the proximity of the mobile device 116 in relation to a financial institution device 122. All such variations are intended to fall within the scope of the present disclosure.

Figure 2:
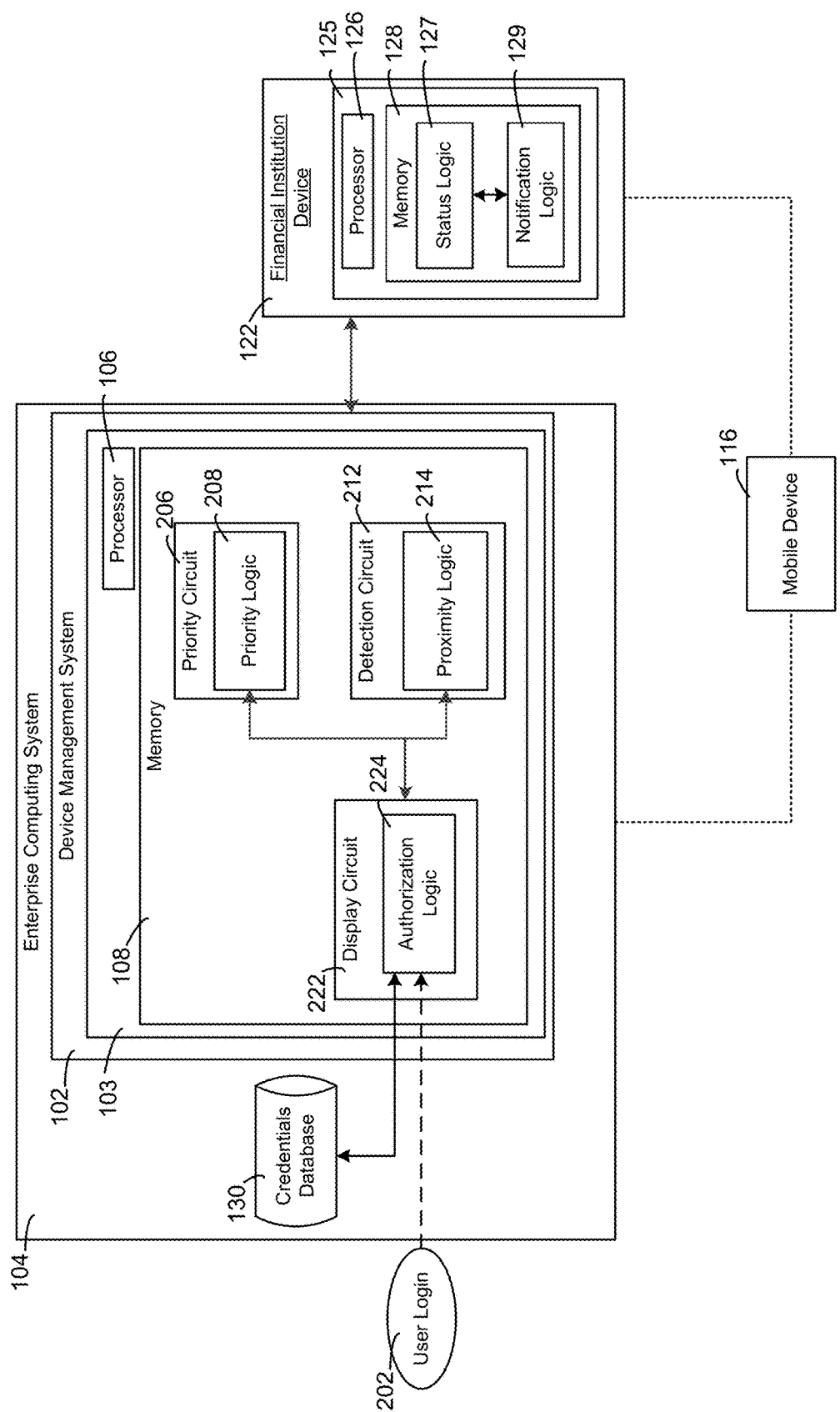
FIG. 2 is a diagram of the device management system of FIG. 1, according to an example embodiment.

Referring now to FIG. 2, a diagram of a device management system 102 and part of the enterprise computing system 104 of FIG. 1 are shown according to an example embodiment. It should be understood in the example depicted, the enterprise computing system includes the device management system 102. However, in another embodiment, the device management system 102 may be provided with the financial institution device 122. In yet another embodiment, a portion of device management system 102 may be provided with each of the enterprise computing system 104 and the financial institution device 122. All such variations are intended to fall within the scope of the present disclosure.

As shown, the enterprise computing system 104 may include a processing circuit 103, which may further include a processor 106 and a memory 108. The processor 103 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 108 (e.g., RAM, NVRAM, ROM, Flash Memory, hard disk storage, etc.) may store data and/or computer code for facilitating the various processes described herein. Moreover, the one or more memory devices 108 may be or include tangible, non-transient volatile memory or non-volatile memory. Accordingly, the one or more memory devices 108 may include database components, object code components, script components, or any other type of information structure for supporting the various activities and information structures described herein.

As mentioned above, in this example, the device management system 102 may be embodied with the enterprise computing system 104. Accordingly, the device management system 102 may be embodied or at least partly embodied in the memory 108, where at least some operations may be executable from the processing circuit 103. Accordingly and in this example, the device management system 102 may be a server-based application executable on the financial institution device 122. In another example, the device management system 102 may be hard-coded into the memory of the financial institution device 122. In this regard, the device management system 102 may be supported by a separate computing system comprising one or more servers, processors, network interface circuits, etc. that transmit the applications for use to the financial institution device 122. In another embodiment and as shown in FIG. 1, the device management system 102 may be embodied in or with the financial institution device 122. All such variations and combinations are intended to fall within the spirit and scope of the present disclosure.

The device management system 102 is shown to include a detection circuit 212, a priority circuit 206, and a display circuit 222, with all such circuits communicably and operatively coupled with to each another. Other embodiments may include more or less circuits without departing from the spirit and scope of the present disclosure.

The detection circuit 212 may be structured to detect or receive an indication of one or more detected mobile devices 116 and determine a proximity of the detected mobile device(s) 116 relative to one or more financial institution devices 122 using proximity logic 214. For example, in one embodiment, the detection circuit 212 may include or be communicably coupled to any type of sensor (e.g., a data tracking Bluetooth sensor) that facilitates, supports, or enables detection of the mobile device(s) 116. For example, the sensor may include a Bluetooth sensor such that via Bluetooth pairing, the sensor may detect and identify Bluetooth enabled mobile device(s) 116. In another embodiment, the detection circuit 212 may include machine-readable media operable to execute a detection program that facilitates the scanning of a predefined area for network-connected devices. For example, the machine-readable media may function like a search engine that acquires data indicative of one or more ports associated with a device to facilitate identification thereof (e.g., ports can include, but are not limited to, HTTP, SSH, FTP, and SNMP). In another example, the machine-readable media may facilitate receiving an indication of a mobile device 116 to pair that device with the financial institution device 122, such that the detection circuit 212 may monitor the paired financial institution device 122 via the mobile device 116. In still another embodiment, the detection circuit 212 may include any combination of a sensors and machine-readable media for facilitating detection and identification of one or more mobile devices 116.

The proximity logic 214 may be structured to determine the proximity of the one or more detected mobile devices 116 relative to one or more financial institution devices 122. In one embodiment, the proximity logic 214 may be communicably and operatively coupled to the one or more mobile devices 116 such that the closest mobile device 116 to a particular financial institution device 122 may receive status information regarding that device 122. In this regard, there may be more than one mobile device 116 enabled to communicate with the device management system 102. As an example, if there are multiple mobile devices 116 monitoring a financial institution device 122, the device management system 102 may communicate with and notify the closest mobile device 116 of the status of the financial institution device 122. In this example, if the financial institution device 122 is located equidistant from two mobile devices 116, the device management system 102 may use the level of authorization of the two users 120 of the mobile devices 116 to determine to which mobile device 116 to send the status information. In another embodiment, the proximity logic 214 may be communicably and operatively coupled to the detection circuit 212, the display circuit 222, and the mobile device 116 such that the proximity logic 214 may sort the financial institution devices 122 according to proximity to the mobile device 116 and communicate with the display circuit 222 to generate a message to transmit to the mobile device 116 to display the sorted list of financial institution devices 122. As an example, there may be an ATM, cash drawer, and printer located at a financial institution and there may be a designated mobile device 116 (e.g., special purpose tablet) used to monitor the ATM, cash drawer, and printer. The ATM may be located closest to the mobile device 116, with the cash drawer second closest, and the printer third closest. The mobile device 116 may receive a list of statuses from these devices which may be sorted in order of proximity. From the top to bottom, the statuses may be listed in order as the ATM first, the cash drawer second, and the printer third. Further arrangements and listing orders may be added beyond that which is described herein.

Referring back to FIG. 1 and as mentioned above, in some embodiments the device management system 102 may be included on the financial institution device 122 such that the financial institution device 122 may directly detect or receive an indication of one or more mobile devices 116 and determine the proximity of a mobile device 116 relative to the financial institution device 122 in the same or similar manner as the enterprise computing system 104. In this configuration, the financial institution device 122 may provide a status to the mobile device 116 directly. As an example, the financial institution device 122 may determine the closest mobile device 116 through use of the proximity logic and as such, may selectively communicate with the mobile device 116 after receiving an indication of the location of that mobile device 116.

The device management system 102 may further include a priority circuit 206. As used herein in regard to the priority circuit 206, the term "priority" may refer to a setting relating to a ranking of highest importance to lowest importance of the statuses of one or more financial institution devices 122. As such, the "priority" may be defined by a user 120 of the mobile device 116 or by the device management system 102 according to various criteria, including, but not limited to, the financial institution device type, status type, proximity, and type of maintenance required by the financial institution device 122. By sorting and displaying financial institution device(s) and/or financial institution device statuses by priority, the status information displayed may be in order of priority, such that the relatively higher importance statuses may be displayed above the relatively lower importance statuses in the status list.

The priority circuit 206 may be structured to receive one or more statuses from the financial institution device 122 and prioritize the statuses relative to one another. In this regard, the priority circuit 206 may include priority logic 208. In one embodiment, the priority logic 208 may be communicably coupled to receive data and/or values from the financial institution device 122 such that priority logic 208 may receive a status and a priority of that status from the financial institution device 122. In another embodiment, the priority logic 208 may generate a priority list. By generating a priority list, statuses may be provided by the priority logic 208 and displayed by the mobile device 116 based on a predefined priority. As an example, a user 120 and/or the device management system 102 may designate a priority for various criteria, such as device type, status type, proximity, maintenance type, and so on. The priority list may use the predefined priorities to sort the financial institution device 122 statuses from highest importance to lowest importance. As an example, if the device management system 102 sets an ATM as having priority over a printer, the device management system 102 may define a priority of "1" for the ATM and a priority of "2" for the printer such that the statuses may be sorted to display the ATM at the top of the list of statuses, followed by the printer. In this example, a priority of "1" may indicate a higher priority than a priority of "2," and so on. As another example, the device management system 102 may designate priority based on other criteria, such as setting a higher priority for a status of "low on cash" relative to a status of "out of ink," and accordingly, the "low on cash" status may be displayed higher in the list of statuses than the "out of ink" status. It should be understood that other example embodiments may utilize different priority schemes that do not depart from the spirit and scope of the present disclosure.

Referring back to FIG. 1 and as mentioned above, in some embodiments the device management system 102 having a priority circuit 206 may be included on a financial institution device 122 such that the financial institution device 122 may receive one or more statuses from the status logic 127 and prioritize the statuses relative to one another in the same or similar manner as the enterprise computing system 104. In another embodiment, the financial institution device 122 may generate a priority list and provide that priority list to be displayed by the mobile device 116.

The device management system 102 may further include a display circuit 222. In the example embodiment in FIG. 2, the display circuit 222 is shown to include authorization logic 224. The display circuit 222 may be structured to generate and provide a message to the mobile device 116 to display one or more statuses of the financial institution device 122 based on received priority and proximity information from the priority logic 208 and proximity logic 214, respectively. The display circuit 222 may also be structured to generate and provide a message to the mobile device 116 regarding the one or more statuses based on a level of authorization of the user 120. In this regard, the display circuit 222 may be communicably and operatively coupled to the priority circuit 206, the detection circuit 212, and the input/output logic 135 of the mobile device 116.

The display circuit 222 may create, generate, establish, update, and maintain a status list of the financial institution devices 122 and any information associated therewith. Accordingly, in one embodiment, the display circuit 222 may include a list generating tool. In another embodiment, the display circuit 222 may include communication circuitry for facilitating the exchange of information between and among the display circuit 222 and any other circuitry or logic. In yet another embodiment, the display circuit 222 may include any combination of machine-readable media, list generating tool, and communication circuitry. The display may include a list of status information, wherein a user 120 may observe or search the list for information associated with the financial institution device(s) 122. Information included in the list may include, but is not limited to, an identification of the financial institution device 122 (e.g., ATM, cash drawer, printer, etc.), a status of the device 122 (e.g., operational, needs maintenance, other, etc.), and detailed instructions on how to fix the device 122.

The authorization logic 224 may be structured to determine the identity and level of authorization of a user 120 of the mobile device 116 and communicate with the display circuit 222 to display one or more statuses of the financial institution device 122 based on the level of authorization of that user 120. In one embodiment, the authorization logic 224 may be communicably coupled to the input/output logic 135 of the mobile device 116 and to the credentials database 130, such that the authorization logic 224 may determine the identity of a user 120 through user input, shown as a user login 202, on the mobile device 116. By communicating with the credentials database 130, the authorization logic 224 may use the determined identity of a user 120 to determine the level of authorization of the user 120 by matching the identity with a corresponding level of authorization. As mentioned above, the credentials database 130 may store and provide access to credentials of the user 120, including, but not limited to name, username, employee number, job title, password, scanned eye data, facial data, fingerprint data, and so on of the user 120. As an example, the user login 202 may include a username, in the form of a self-designated username, an employee identification number, or any other identifiable combination of letters, numbers, and symbols. The user login 202 may additionally include a password, or other passcode, that the user 120 inputs to the mobile device 116. In this example, the authorization logic 224 may use the username and/or password to determine a level of authorization of the user 120 by matching the username and/or password with a designated level of authorization in the credentials database 130. Further, the authorization logic 224 may prompt the user 120 to input the user login 202 once the user 120 "wakes up" the mobile device 116 by either touching a touch screen on the mobile device 116, turning the mobile device 116 on, or performing any other initial action on the mobile device 116 that may indicate a new user 120 has started using the mobile device 116. The prompt may facilitate the reception of the user credentials and determination of an authorization level of the user 120.

In another embodiment, the authorization logic 224 may be communicably coupled to a mobile device 116 that includes a fingerprint sensor for receiving a fingerprint and/or handprint of the user 120. For example, the mobile device 116 may include a fingerprint sensor such that when the user 120 picks up the device 116 and/or places a finger on a sensor on the device 116, the sensor may transmit the fingerprint to the authorization logic 224 and the authorization logic 224 may then determine the identity of the user 120 based on that fingerprint. In still another embodiment, the authorization logic 224 may be communicably coupled to a mobile device 116 that includes an eye scanner (e.g., retinal scanner, iris scanner) for receiving a scan of the eye of the user 120. For example, the eye scanner may scan an eye of the user 120 and compare the scanned data to data stored in the credentials database 130 to determine the identity of the user 120. In yet another embodiment, the authorization logic 224 may be communicably coupled to a mobile device 116 that includes facial recognition circuitry, wherein the facial recognition circuitry may determine the identity of the user 120 by collecting facial data points, for example, by using a camera on the mobile device 116 and comparing them to known facial data points in the credentials database 130. In other embodiments, the authorization logic 244 may include or be communicably coupled to any combination of user input, sensor, scanner, or facial recognition circuitry to determine the identity and a level of authorization of the user 120. Based on the log-in credential received from the mobile device (e.g., eye scan, facial recognition, fingerprint sensor, etc.), the authorization logic may determine an identity and level of authorization of the user 120. It should be understood that the aforementioned list is not meant to be limiting as other credentials may be used by the authorization logic 224 to determine an identity of the user of the mobile device 116.

Referring back to FIG. 1 and as mentioned above, in some embodiments the display circuit 222 and authorization logic 224 may be included on a financial institution device 122 such that the financial institution device 122 may generate and provide a message to one or more mobile devices 116 regarding the status of the financial institution device 122 based on a level of authorization of the user 120. This may be performed in the same or similar manner as is performed with the device management system 102 embodied with or on the enterprise computing system 104.

Figure 3:
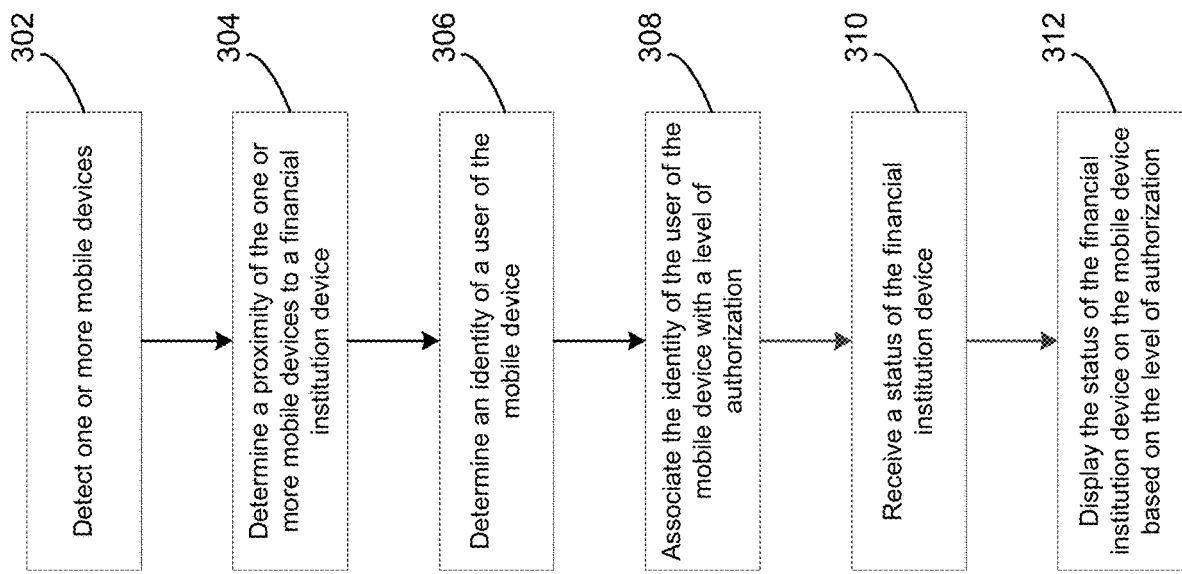
FIG. 3 is a flow diagram of a method of determining a status of one or more financial institution devices using the device management system of FIGS. 1-2, according to an example embodiment.

Referring now to FIG. 3, an example method of managing and maintaining financial institution devices is depicted. Method 300 may be implemented with the device management system 102 of FIGS. 1-2, such that reference may be made to one or more components of FIGS. 1-2 in explaining method 300.

At process 302, one or more mobile devices are detected. Process 302 may be performed by the detection circuit 212. As mentioned above, detecting a mobile device 116 may be performed using any suitable component and process. For example, the mobile device 116 may be detected using any type of sensor (e.g., a data tracking Bluetooth sensor). In another embodiment, the detection circuit 212 may include machine-readable media operable to execute a detection program that facilitates the scanning of a predefined area for network-connected devices. For example, the machine-readable media may function like a search engine that acquires data indicative of one or more ports associated with a device to facilitate identification thereof (e.g., ports can include, but are not limited to, HTTP, SSH, FTP, and SNMP). In another example, the machine-readable media may facilitate receiving an indication of a mobile device 116 to pair that device with a financial institution device 122, such that the detection circuit 212 may monitor the paired financial institution device 122 via the mobile device 116.

At process 304, a proximity of the one or more mobile devices to a financial institution device is determined. Process 304 may be performed by the proximity logic 214 of the detection circuit 212. As mentioned above, the proximity logic 214 may determine the location of the mobile device 116 relative to the financial institution device 122 and sort the financial institution devices 122 in order of proximity to the mobile device 116. Additionally, the proximity logic 214 may be structured to determine the closest mobile device 116 to a particular financial institution device 122. In that regard, the proximity logic 214 may be structured to communicate with the device management system 102 regarding the closest mobile device 116 such that the closest mobile device 116 may be notified of the status of that particular financial institution device 122.

At process 306, an identity of a user of the mobile device is determined. Process 306 may be performed by the authorization logic 224 and the credentials database 130. As mentioned above, the authorization logic 224 may receive user input (e.g., user login 202) corresponding to a set of credentials in the credentials database 130. The authorization logic 224 may use that user input to determine the identity of the user 120. In another embodiment, the authorization logic 224 may determine the identity of the user 120 by various other techniques, such as sensing a fingerprint of the user 120, scanning an eye of the user 120, and using facial recognition systems. These techniques may be performed as a security login process for a user 120 using the mobile device 116.

At process 308, the identity of the user of the mobile device is associated with a level of authorization. Process 308 may be performed by the authorization logic 224 and the credentials database 130. As mentioned above, the authorization logic 224 may communicate with the credentials database 130 to determine the level of authorization of the user 120 by accessing the credentials of the user 120 and associating those credentials with a level of authorization. For example, different users 120 of the mobile device 116 may be privy to different sets of information/content regarding one or more or a particular financial institutional device 122. As an example, a user 120 may be privy to information regarding a printer, but not to information regarding an ATM.

At process 310, a status of the one or more financial institution devices is received. Process 310 may be performed by the priority circuit 212. As mentioned above, the device management system 102 may receive a status of the one or more financial institution devices 122 through the priority circuit 212. The priority circuit 212 may include a receiver to receive a status and priority from the financial institution device 122.

At process 312, the status of the one or more financial institution devices is displayed based on the level of authorization. Process 312 may be performed by the display circuit 222. The display circuit 222 may generate and provide a message to the mobile device 116 to display the status(es). As mentioned above, the display circuit 222 may create, generate, establish, update, and maintain a status list of the financial institution devices 122 and any information associated therewith. The display may include a list of such information, wherein a user 120 may observe or search the list for information associated with the financial institution device(s) 122.

With the aforementioned description in mind and with reference to FIGS. 4-6, an example implementation of process 300 may be described as follows. As shown in FIG. 4, a user 120 is positioned within an environment, shown as a financial institution 400. In this example, the mobile device 116 includes an input/output device 402 (e.g., touch screen, microphone, speaker, keyboard, etc.) to accept user input and the mobile device 116 is in communication with the device management system 102 to perform the following functions. Accordingly, using the network capabilities of the mobile device 116 (e.g., Wi-Fi, Bluetooth, Internet), the mobile device 116 may emit a beam 406. The beam 406 (e.g., ray, etc.) may be structured to communicate with other networked devices (e.g., financial institution devices 122). In this regard, the beam 406 may be structured to detect one or more mobile devices 116 (process 302). As shown in this example, the device management system 102 has detected the mobile device 116 and is currently monitoring financial institution devices 122, including an ATM 1 (412), ATM 2 (414), cash drawer 1 (416), cash drawer 2 (418), printer 1 (420), and printer 2 (422). After detection of the mobile device 116, a proximity of the mobile device 116 to the financial institution devices 122 is determined (process 304).

Subsequently, the identity of the user 120 is determined (process 306). In this example, the identity of the user 120 is determined by user input into the input/output device 402. The user 120 inputs a user login (e.g., username and password) into the mobile device 116. By the user login, the device management system 102 determines the identity of the user 120. The device management system 102 then determines the level of authorization associated with the identity of the user 120 based on the user login (process 308). One or more statuses of the financial institution devices 122 are received by the device management system 102 (process 310) and displayed on the mobile device 116 (process 312).

Referring now to FIG. 5 with reference to FIG. 4, a ranked listing of the determined statuses is displayed on the mobile device 116, according to an example embodiment. As shown, the device management system 102 has generated a display 500 on the mobile device 116 that identifies a device/priority 502, a status 504, and a recommended action

506. In this configuration, the device management system 102 determines a priority for each status and presents them to the user 120 in the form of a priority list. The priority list provides an indication of a relative ranking of each status 504 with respect to the priority associated with that status and/or device.

In this example, the ATM 1 (412) has a relatively higher priority than ATM 2 (414), which has a relatively higher priority than the cash drawer 1 (416), and so on. In this regard and as mentioned above, the term "priority" may refer to a setting relating to a ranking of highest importance to lowest importance of statuses of one or more financial institution devices. As such, the "priority" may be defined according to the financial institution device type, status type, proximity, and type of maintenance required by the financial institution device 122. For example, here, the priority is set according to the type of device 502 and the status 504 of the device. Accordingly, an ATM device type (e.g., ATM 1 (412), ATM 2 (414)) has a higher priority than a cash drawer device type (e.g., cash drawer 1 (416), cash drawer 2 (418)) and a printer device type (e.g., printer 1 (420), printer 2 (422)). Additionally, a "Needs Maintenance" status has higher priority than "Disconnected from Network" and "Out of Cash" statuses. Accordingly, the display 500 reflects these priority determinations.

Figure 6:
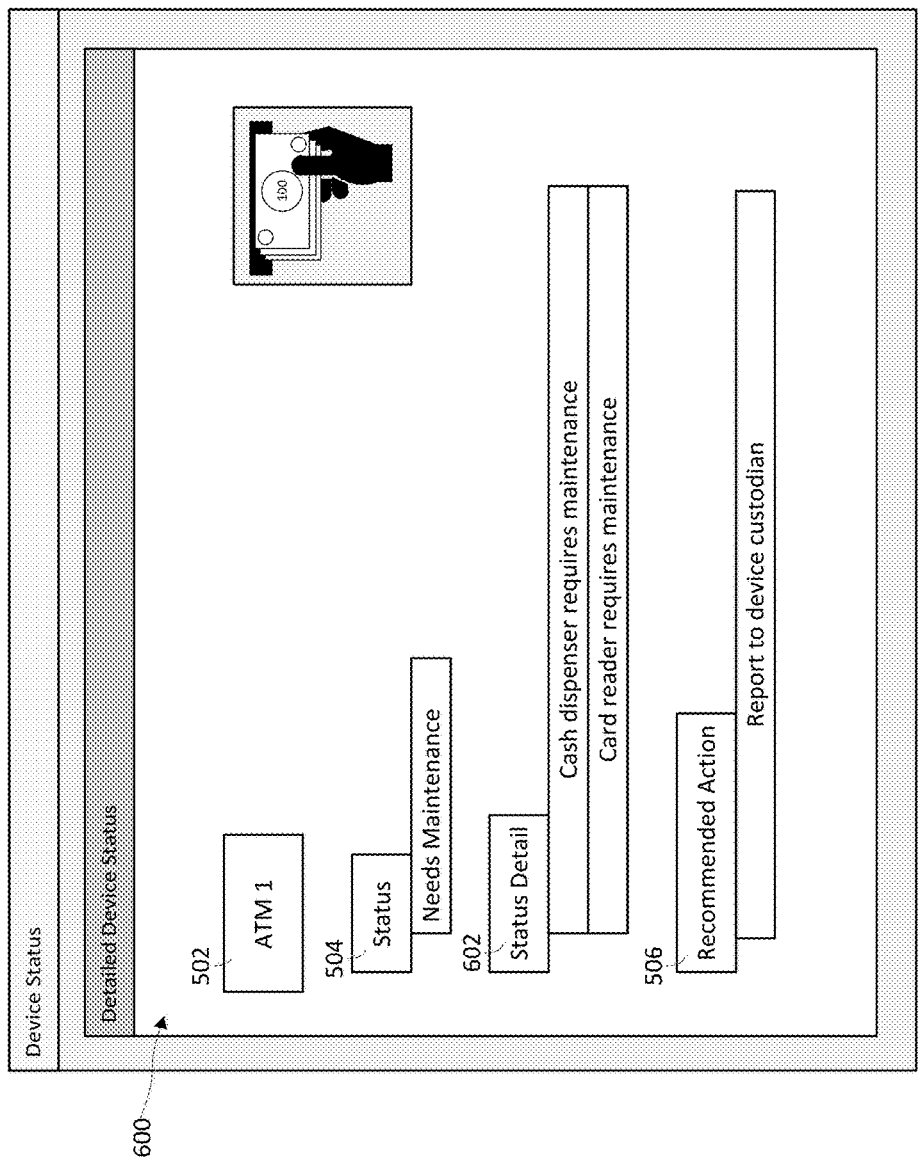
FIG. 6 is a diagram of another display generated by the device management system of FIGS. 1-2, according to an example embodiment.

Referring now to FIG. 6 with reference to FIGS. 4-5, a pop-up window of the financial institution device statuses is shown on the mobile device 116, according to an example embodiment. If a user 120 highlights a row of the display 500 and then clicks on the same row again after it is already highlighted, the display 500 may open a pop-up window (e.g., detailed display 600) with further detail about that particular device. For example, if the user 120 highlights row "1. ATM 1" and then clicks on that row again, the device management system 102 may generate a detailed display 600 in the form of a pop-up window. The detailed display 600 includes the device 502 (e.g., ATM 1) and the status 504 (e.g., "Needs Maintenance"). The detailed display 600 additionally identifies further detail (e.g., Status Detail 602) of the status of the particular device (e.g., ATM 1 (412)). As shown, the Status Detail 602 may identify the specific functions and/or components that require maintenance on a particular device. In the example shown, the Status Detail 602 further specifies that the "Cash dispenser requires maintenance," and the "Card reader requires maintenance."

Figure 7:
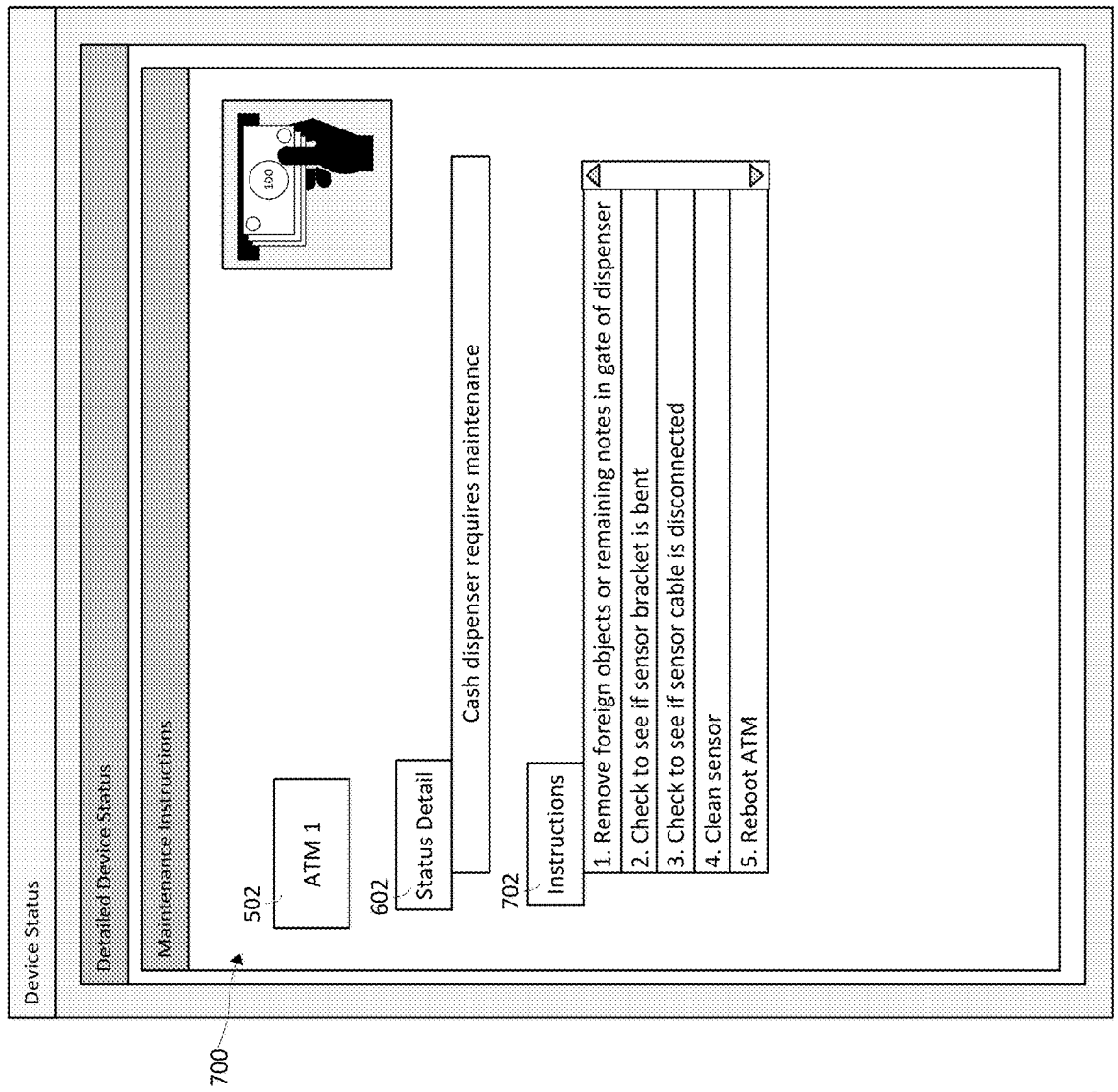
FIG. 7 is a diagram of another display generated by the device management system of FIGS. 1-2, according to an example embodiment.

Referring now to FIG. 7 with reference to FIGS. 4-6, a further pop-up window of instructions on how to fix or maintain the relevant financial institution device 122 is shown on the mobile device 116, according to an example embodiment. If a user 120 highlights a row of the display 600 under the Status Detail 602 section, and then clicks on the same row again after it is already highlighted, the display 600 may open a further pop-up window (e.g., maintenance instructions display 700) with further detail on how to fix or maintain that particular device 122. For example, if the user 120 highlights row "Cash dispenser requires maintenance" and then clicks on that row again, the device management system 102 may generate a maintenance instructions display 700 in the form of a pop-up window. The maintenance instructions display includes the device 502 (e.g., ATM 1) and the status 504 (e.g., "Needs Maintenance"). The maintenance instructions display 700 additionally identifies further detail (e.g., Instructions 702) of how to fix or maintain that particular device (e.g., ATM 1 (412)). As shown, the Instructions 702 may identify the specific steps required to fix or maintain that device 122. In the example shown, the Instructions 702 further specify to "1. Remove foreign objects or remaining notes in gate of dispenser," "2. Check to see if sensor bracket is bent," "3. Check to see if sensor cable is disconnected," "4. Clean sensor," and "5. Reboot ATM." A user 120 viewing the display 700 on the mobile device 116 may follow the steps to perform the maintenance on the financial institution device 122.

Based on the foregoing, an example process may be described as follows. In an financial institution environment, there may be one or more financial institution devices being monitored. For illustration purposes, the financial institution devices may include an ATM, a cash drawer, and a printer. The status of these devices may be transmitted from the financial institution device to the device management system on an on-going basis. Once received by the device management system, the status may be displayed on a mobile device according to a priority of that status, a proximity of the financial institution device relative to the mobile device, and a level of authorization of a user of the mobile device. In one embodiment, the mobile device may be a special purpose tablet located at the financial institution intended for the specific use of managing and maintaining the ATM, cash drawer, and printer. The financial institution may have predefined that the ATM has the highest priority of the devices located at the financial institution, with the cash drawer having the second highest priority, followed by the printer. Thus, when the financial institution device statuses are displayed on the special purpose tablet, the ATM status may appear first, followed by the cash drawer status and the printer status. Additionally, a user may have a predefined level of authorization such that the user may only be able to see the status of one of the devices, such as the ATM. Thus, when the financial institution device statuses are displayed on the special purpose table while in use by that particular user, the ATM status is the only status that will appear.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
a processor coupled to a non-transitory storage medium, wherein the processor is structured to:
receive, from a mobile device, an indication of a location of the mobile device;
determine an identity of a user of the mobile device;
determine a credential of the user based on the identity of the user of the mobile device:
determine respective proximities of the mobile device to a plurality of financial institution devices, wherein the plurality of financial institution devices include an automated teller machine, a printer, and a teller cash drawer;
receive a real-time status update from the plurality of financial institution devices indicating respective statuses of the plurality of financial institution devices;

determine an authorized subset of the plurality of financial institution devices for which the user is authorized based on the credential of the user;

generate a list of statuses to be displayed on the mobile device for at least a portion of the authorized subset of the plurality of financial institution devices for which the user of the mobile device is authorized, wherein the list is ordered by priority with a device type having a higher priority than a status, wherein the device type is ordered in priority with the automated teller machine having a higher priority than the teller cash drawer, and the teller cash drawer having a higher priority than the printer, and wherein the list is further ordered based on the respective proximities of the mobile device to the authorized subset of the plurality of financial institution devices;

generate maintenance instructions for at least the portion of the authorized subset of the plurality of financial institution devices; and transmit the list of statuses and the maintenance instructions to the mobile device.

2. The system of claim 1, wherein the list provides a recommended action for the user of the mobile device to take regarding at least the portion of the authorized subset of the plurality of financial institution devices.

3. The system of claim 1, wherein the system includes at least one of a personal mobile device of personnel, a designated mobile device for personnel, and a financial institution computer.

4. The system of claim 1, wherein the identity of the user of the mobile device is determined based on login credentials of the user.

5. The system of claim 1, wherein the identity of the user of the mobile device is determined using at least one of an eye scanner, a fingerprint sensor, or facial recognition circuitry.

6. A method comprising:

receiving, by a detection circuit of a device management system comprising at least one processor connected with at least one memory device from a mobile device, an indication of a location of the mobile device;

determining, by authorization logic of the device management system, an identity of a user of the mobile device;

determining a credential of the user based on the identity of the user of the mobile device;

determining, by proximity logic of the device management system, respective proximities of the mobile device to a plurality of financial institution devices, wherein the plurality of financial institution devices include an automated teller machine, a printer, and a teller cash drawer;

receiving, by priority logic of the device management system, real-time status update from the plurality of financial institution devices indicating respective statuses of the plurality of financial institution devices for which the user of the mobile device is authorized based on the credential of the user;

determining an authorized subset of the plurality of financial institution devices for which the user is authorized based on the credential of the user;

generating a list of statuses to be displayed on the mobile device for at least a portion of the authorized subset of the plurality of financial institution devices for which the user of the mobile device is authorized, wherein the list is ordered by priority with a device type having a higher priority than a status, wherein the device type is ordered in priority with the automated teller machine having a higher priority than the teller cash drawer, and the teller cash drawer having a higher priority than the printer, and wherein the list is further ordered based on the respective proximities of the mobile device to the authorized subset of the plurality of financial institution devices;

generating maintenance instructions for at least the portion of the authorized subset of the plurality of financial institution devices; and transmitting, by a display circuit of the device management system, the list of statuses and the maintenance instructions to the mobile device.

7. The method of claim 6, further comprising providing a recommended action for the user of the mobile device to take regarding at least the portion of the authorized subset of the plurality of financial institution devices.

8. The method of claim 6, wherein the mobile device includes at least one of a personal mobile device of personnel, a designated mobile device for personnel, and a financial institution computer.

9. The method of claim 6, wherein the identity of the user of the mobile device is determined based on login credentials of the user.

10. A non-transitory computer readable medium comprising instructions that, when executed, cause a processor to:

determine an identity of a user of a mobile device;

determine a credential of the user based on the identity of the user of the mobile device;

determine respective proximities of the mobile device to a plurality of financial institution devices based on an indication of a location of the mobile device received from the mobile device, wherein the plurality of financial institution devices include an automated teller machine, a printer, and a teller cash drawer;

receive a real-time status update from the plurality of financial institution devices indicating respective statuses of the plurality of financial institution devices;

determine an authorized subset of the plurality of financial institution devices for which the user of the mobile device is authorized based on the credential of the user;

generate a list of statuses to be displayed on the mobile device for at least a portion of the authorized subset of the plurality of financial institution devices for which the user of the mobile device is authorized, wherein the list is ordered by priority with a device type having a higher priority than a status, wherein the device type is ordered in priority with the automated teller machine having a higher priority than the teller cash drawer, and the teller cash drawer having a higher priority than the printer, and wherein the list is further ordered based on the respective proximities of the mobile device to the authorized subset of the plurality of financial institution devices;

generate maintenance instructions for at least the portion of the authorized subset of the plurality of financial institution devices; and transmit the list of statuses and the maintenance instructions to the mobile device.

11. The non-transitory computer readable medium of claim 10, wherein the instructions, when executed, further cause the processor to provide a recommended action for the user of the mobile device to take regarding at least the portion of the authorized subset of the plurality of financial institution devices.

12. The non-transitory computer readable medium of claim 10, wherein the mobile device is configured to display the status of the authorized subset of the plurality of financial institution devices.

13. The non-transitory computer readable medium of claim 10, wherein the instructions, when executed, further cause the processor to receive data from a credentials database storing the identity of the user of the mobile device and a level of authorization of the user.

14. The non-transitory computer readable medium of claim 10, wherein the instructions, when executed, further cause the processor to determine the identity of the user of the mobile device based on login credentials entered into the mobile device.

15. The non-transitory computer readable medium of claim 10, wherein the instructions, when executed, further cause the processor to determine the identity of the user of the mobile device using data received from at least one of an eye scanner, a fingerprint sensor, or facial recognition circuitry.

16. The system of claim 1, wherein the statuses of the plurality of financial institution devices indicates that the corresponding financial institution device is operational, needs maintenance, or is disconnected from a network.

17. The method of claim 6, wherein the statuses of the plurality of financial institution devices indicates that the corresponding financial institution device is operational, needs maintenance, or is disconnected from a network.

18. The non-transitory computer readable medium of claim 10, wherein the statuses of the plurality of financial institution devices indicates that the corresponding financial institution device is operational, needs maintenance, or is disconnected from a network.

* * * * *